US008432827B2

(12) United States Patent
Matityahu et al.

(10) Patent No.: US 8,432,827 B2
(45) Date of Patent: *Apr. 30, 2013

(54) ARRANGEMENT FOR UTILIZATION RATE DISPLAY AND METHODS THEREOF

(75) Inventors: Eldad Matityahu, Palo Alto, CA (US); Robert Shaw, Los Gatos, CA (US); Dennis Angelo Ramirez Carpio, San Jose, CA (US); Ky Hong Le, San Jose, CA (US); Dong Su Lee, Cupertino, CA (US)

(73) Assignee: Net Optics, Inc., Santa Clara, CA (US)

( * ) Notice: Subject to any disclaimer, the term of this patent is extended or adjusted under 35 U.S.C. 154(b) by 3392 days.

This patent is subject to a terminal disclaimer.

(21) Appl. No.: 13/042,135

(22) Filed: Mar. 7, 2011

(65) Prior Publication Data
US 2011/0164521 A1 Jul. 7, 2011

Related U.S. Application Data

(63) Continuation of application No. 11/835,233, filed on Aug. 7, 2007, now Pat. No. 7,903,576.

(51) Int. Cl.
*H04J 1/16* (2006.01)
(52) U.S. Cl.
USPC .......................................... 370/252; 709/224
(58) Field of Classification Search .................. 709/224; 370/252
See application file for complete search history.

(56) References Cited

U.S. PATENT DOCUMENTS

| 4,802,161 | A | | 1/1989 | Byars et al. |
| 5,173,794 | A | | 12/1992 | Cheung et al. |
| 5,442,629 | A | * | 8/1995 | Geyer et al. ................. 370/252 |
| 5,539,727 | A | | 7/1996 | Kramarczyk et al. |

(Continued)

FOREIGN PATENT DOCUMENTS

| JP | 2001-197066 A | 7/2001 |
| JP | 2006-148686 A | 6/2006 |

(Continued)

OTHER PUBLICATIONS

Belkin International, Inc., "Belkin Quick Installation Guide", N1 Vision Wireless 41 Router, Belkin International, Inc., Compton, CA, Feb. 11, 2009, 3 pages total.

(Continued)

*Primary Examiner* — Hassan Kizou
*Assistant Examiner* — Ashil Farahmand
(74) *Attorney, Agent, or Firm* — IPSG, P.C. Intellectual Property Law (57) ABSTRACT

A network arrangement for automatically displaying statistical data is provided. The arrangement includes a port for receiving data traffic, a physical interface layer for copying data traffic, and a bus for directing a copy of the data traffic to monitoring devices. The arrangement also includes logic arrangement for analyzing the copy of data traffic, which includes at least a Receive Data Valid signal (including a rising edge and a falling edge) and a Receive Clock signal (including a rising edge and a falling edge). The arrangement further includes incrementing a first counter when the Receive Data Valid rising edge is received and incrementing a second counter when at least one of the Receive Clock rising edge and the Receive Clock falling edge is received. The arrangement moreover includes logic arrangement for displaying statistical data pertaining to the data traffic and a visual display arrangement for displaying statistical data.

21 Claims, 6 Drawing Sheets

U.S. PATENT DOCUMENTS

| | | | |
|---|---|---|---|
| 5,550,802 | A | 8/1996 | Worsley et al. |
| 5,550,803 | A * | 8/1996 | Crayford et al. ............. 370/246 |
| 5,648,965 | A | 7/1997 | Thadani et al. |
| 5,696,859 | A | 12/1997 | Onaka et al. |
| 5,710,846 | A | 1/1998 | Wayman et al. |
| 5,715,247 | A | 2/1998 | Nara et al. |
| 5,774,453 | A | 6/1998 | Fukano et al. |
| 5,781,318 | A | 7/1998 | Tremblay |
| 5,825,775 | A | 10/1998 | Chin et al. |
| 5,887,158 | A | 3/1999 | Sample et al. |
| 5,983,308 | A | 11/1999 | Kerstein |
| 6,041,037 | A | 3/2000 | Nishio et al. |
| 6,047,321 | A | 4/2000 | Raab et al. |
| 6,108,310 | A | 8/2000 | Wilkinson et al. |
| 6,167,025 | A | 12/2000 | Hsing et al. |
| 6,272,136 | B1 | 8/2001 | Lin et al. |
| 6,366,557 | B1 | 4/2002 | Hunter |
| 6,424,627 | B1 | 7/2002 | Sorhaug et al. |
| 6,449,247 | B1 | 9/2002 | Manzardo et al. |
| 6,530,047 | B1 * | 3/2003 | Edwards et al. ............. 714/724 |
| 6,542,145 | B1 | 4/2003 | Resisinger et al. |
| 6,650,803 | B1 | 11/2003 | Ramaswami et al. |
| 6,658,565 | B1 | 12/2003 | Gupta et al. |
| 6,687,009 | B2 | 2/2004 | Hui et al. |
| 6,687,847 | B1 | 2/2004 | Aguilera et al. |
| 6,714,976 | B1 | 3/2004 | Wilson et al. |
| 6,798,740 | B1 * | 9/2004 | Senevirathne et al. ....... 370/219 |
| 6,801,940 | B1 | 10/2004 | Moran et al. |
| 6,823,383 | B2 | 11/2004 | MacBride |
| 6,836,540 | B2 | 12/2004 | Falcone et al. |
| 6,841,985 | B1 | 1/2005 | Fetzer |
| 6,850,706 | B2 | 2/2005 | Jager et al. |
| 6,882,654 | B1 | 4/2005 | Nelson |
| 6,898,630 | B2 | 5/2005 | Ueno et al. |
| 6,898,632 | B2 | 5/2005 | Gordy et al. |
| 6,914,892 | B1 | 7/2005 | Cooper et al. |
| 6,925,052 | B1 | 8/2005 | Reynolds et al. |
| 6,944,437 | B2 | 9/2005 | Yang et al. |
| 6,975,209 | B2 | 12/2005 | Gromov |
| 7,027,437 | B1 | 4/2006 | Merchant et al. |
| 7,171,504 | B2 | 1/2007 | Ishii |
| 7,277,957 | B2 | 10/2007 | Rowley et al. |
| 7,308,705 | B2 | 12/2007 | Gordy et al. |
| 7,321,565 | B2 | 1/2008 | Todd et al. |
| 7,324,553 | B1 | 1/2008 | Varier et al. |
| 7,415,013 | B1 | 8/2008 | Lo |
| 7,430,354 | B2 | 9/2008 | Williams |
| 7,477,611 | B2 | 1/2009 | Huff |
| 7,486,624 | B2 | 2/2009 | Shaw et al. |
| 7,486,625 | B2 | 2/2009 | Matityahu et al. |
| 7,505,416 | B2 | 3/2009 | Gordy et al. |
| 7,573,896 | B2 | 8/2009 | Wang et al. |
| 7,616,587 | B1 | 11/2009 | Lo et al. |
| 7,760,859 | B2 | 7/2010 | Matityahu et al. |
| 7,788,365 | B1 | 8/2010 | Foster et al. |
| 2001/0040870 | A1 | 11/2001 | Ohmori et al. |
| 2002/0003592 | A1 | 1/2002 | Hett et al. |
| 2002/0023184 | A1 | 2/2002 | Paul |
| 2002/0026374 | A1 | 2/2002 | Moneymaker et al. |
| 2002/0032880 | A1 | 3/2002 | Poletto et al. |
| 2002/0061027 | A1 | 5/2002 | Abiru et al. |
| 2002/0073199 | A1 | 6/2002 | Levine et al. |
| 2002/0087710 | A1 | 7/2002 | Aiken et al. |
| 2002/0110148 | A1 | 8/2002 | Hickman et al. |
| 2002/0146016 | A1 | 10/2002 | Liu et al. |
| 2002/0176355 | A1 | 11/2002 | Mimms et al. |
| 2002/0180592 | A1 | 12/2002 | Gromov |
| 2003/0033406 | A1 * | 2/2003 | John et al. ..................... 709/224 |
| 2003/0112760 | A1 | 6/2003 | Puppa et al. |
| 2003/0142666 | A1 | 7/2003 | Bonney et al. |
| 2003/0145039 | A1 | 7/2003 | Bonney et al. |
| 2003/0147385 | A1 | 8/2003 | Montalvo et al. |
| 2003/0184386 | A1 | 10/2003 | Varner et al. |
| 2003/0215236 | A1 | 11/2003 | Manifold |
| 2004/0008675 | A1 | 1/2004 | Basso et al. |
| 2004/0023651 | A1 | 2/2004 | Gollnick et al. |
| 2004/0062556 | A1 | 4/2004 | Kubo et al. |
| 2004/0096227 | A1 | 5/2004 | Bulow |
| 2004/0109411 | A1 | 6/2004 | Martin |
| 2004/0120259 | A1 | 6/2004 | Jones et al. |
| 2004/0128380 | A1 | 7/2004 | Chen et al. |
| 2004/0190547 | A1 | 9/2004 | Gordy et al. |
| 2004/0202164 | A1 | 10/2004 | Hooper et al. |
| 2004/0215832 | A1 | 10/2004 | Gordy et al. |
| 2004/0264494 | A1 | 12/2004 | Kim |
| 2005/0005031 | A1 | 1/2005 | Gordy et al. |
| 2005/0060535 | A1 | 3/2005 | Bartas |
| 2005/0071711 | A1 | 3/2005 | Shaw |
| 2005/0108444 | A1 | 5/2005 | Flauaus et al. |
| 2005/0122910 | A1 | 6/2005 | Parupudi et al. |
| 2005/0129033 | A1 | 6/2005 | Gordy et al. |
| 2005/0132051 | A1 | 6/2005 | Hill et al. |
| 2005/0213512 | A1 | 9/2005 | Konuma et al. |
| 2005/0231367 | A1 | 10/2005 | Bellantoni |
| 2005/0257262 | A1 | 11/2005 | Matityahu et al. |
| 2005/0271065 | A1 | 12/2005 | Gallatin et al. |
| 2006/0083268 | A1 | 4/2006 | Holaday et al. |
| 2006/0083511 | A1 | 4/2006 | Edmunds et al. |
| 2006/0153092 | A1 | 7/2006 | Matityahu et al. |
| 2006/0200711 | A1 | 9/2006 | Schondelmayer et al. |
| 2006/0215566 | A1 | 9/2006 | Walsh |
| 2006/0233115 | A1 | 10/2006 | Matityahu et al. |
| 2006/0282529 | A1 | 12/2006 | Nordin |
| 2007/0002754 | A1 | 1/2007 | Matityahu et al. |
| 2007/0002755 | A1 | 1/2007 | Matityahu et al. |
| 2007/0002769 | A1 | 1/2007 | Matityahu et al. |
| 2007/0064917 | A1 | 3/2007 | Matityahu et al. |
| 2007/0081549 | A1 | 4/2007 | Cicchetti et al. |
| 2007/0081553 | A1 | 4/2007 | Cicchetti et al. |
| 2007/0171908 | A1 | 7/2007 | Tillman et al. |
| 2007/0171966 | A1 | 7/2007 | Light et al. |
| 2007/0174492 | A1 | 7/2007 | Light et al. |
| 2007/0211682 | A1 | 9/2007 | Kim et al. |
| 2007/0213862 | A1 | 9/2007 | Chang et al. |
| 2007/0297342 | A1 * | 12/2007 | Yasuta .......................... 370/252 |
| 2008/0014879 | A1 | 1/2008 | Light et al. |
| 2008/0049627 | A1 | 2/2008 | Nordin |
| 2008/0214108 | A1 | 9/2008 | Beigne et al. |
| 2009/0040932 | A1 | 2/2009 | Matityahu et al. |
| 2009/0041051 | A1 | 2/2009 | Matityahu et al. |
| 2009/0168659 | A1 | 7/2009 | Matityahu et al. |
| 2009/0279541 | A1 | 11/2009 | Wong et al. |
| 2010/0146113 | A1 | 6/2010 | Matityahu et al. |

FOREIGN PATENT DOCUMENTS

| | | | |
|---|---|---|---|
| KR | 10-2004-0058415 A | | 7/2004 |
| WO | WO-02/19642 A1 | | 3/2002 |
| WO | WO-2004/012163 A2 | | 2/2004 |

OTHER PUBLICATIONS

Belkin International, Inc., "Network Status Display", Belkin international, Inc., Compton, CA, 2007, 1 page total.

HP, et al., "Reduced Gigabit Media Independent Interface (RGMII)", Nov. 30, 2005, http://web.archive.org/web/20051113015000/http://www.hp.com/md/pdfs/RGMIIv2_0_final_hp.Pdf.

Wikipedia, "Field-programmable Gate Array", Jan. 21, 2005, http://web.archive.org/web/20050121193052/http://en.wikipedia.org/wiki/Field-programmable_gate_array.

XILINX, "LogiCore OPB Ethernet Lite Media Access Controller", v1.01b, Mar. 3, 2006.

"Fast Ethernet Fiber-to-Fiber Converters", Canary Communications, Inc. 7 pages total, 2004.

"Sequence Reducer/ Sequence Mirror Operator's Guide", Peribit Networks, Inc. 13 pages total. 2001-2005.

"PeriScope Central Management System (CMS) 5.0 Administrators Guide", Peribit Networks, Inc. 13 pages total. 2003-2004.

"VSS Coppertap Literature", VSS Monitoring Inc. 2 pages. 2003-2004.

"VSS Easy install Guide", VSS Monitoring Inc, 8 pages total. 2003-2005.

"VSS Linksafe", VSS Monitoring Inc., 1 page. 2003-2005.

Anonymous, "100Base-TX/100BBase-FX Media Converters E-100BTX-FX-04 User's Guide", Transitions Networks, Minneapolis, MN, Copyright 1998-2000, 4 pages.

Gigamon Systems LLC, "GigaVUE—Product Brief", Gigamon Systems LLC, http://web.archive.org/web/20070815021951/www.gigamon.com/pdf/GigamonSystems-OnePageProductBrief.pdf, Aug. 17, 2007, 1 page.
"Non Final Office Action", U.S. Appl. No. 13/036,842, Mailing Date: Oct. 17, 2012.
"Non Final Office Action", U.S. Appl. No. 13/230,760, Mailing Date: Oct. 4, 2012.
"Written Opinion", Issued in PCT Application No. PCT/US2006/25436, Mailing Date: Mar. 4, 2008.
"International Search Report", Issued in PCT Application No. PCT/US2006/25436, Mailing Date: Mar. 4, 2008.
"International Preliminary Report on Patentability", Application No. PCT/US06/25436, Mailing Date: May 22, 2008.
"Non Final Office Action", U.S. Appl. No. 11/223,477, Mailing Date: Jun. 12, 2008.
"Non Final Office Action", U.S. Appl. No. 11/174,033, Mailing Date: May 29, 2008.
"Final Office Action", U.S. Appl. No. 11/174,033, Mailing Date: Dec. 10, 2008.
"Non Final Office Action", U.S. Appl. No. 11/174,033, Mailing Date: Sep. 15, 2009.
"Final Office Action", U.S. Appl. No. 11/174,033, Mailing Date: Jun. 24, 2010.
"Non Final Office Action", U.S. Appl. No. 11/174,033, Mailing Date: Apr. 28, 2008.
"Non Final Office Action", U.S. Appl. No. 11/174,032, Mailing Date: Apr. 23, 2008.
"Inter Partes Reexamination Office Action", U.S. Appl. No. 95/001,318, Patent in Re-examination: 7,486,625, Mailing Date: Apr. 23, 2010.
"Replacement Statement and Explanation under 37CFR 1.915 in Support of Request for Inter Partes Reexamination of US Patent 7,486,625", Sonnenschein Nath & Rosenthal LLP, Jan. 22, 2010, 251 pages.
"Request for Inter Partes Reexamination of US Patent 7,486,625", Sonnenschein Nath & Rosenthal LLP, Dec. 18, 2009, 69 pages.
Non Final Office Action, U.S. Appl. No. 11/174,238, Mailing Date: Oct. 1, 2008.
"International Preliminary Report on Patentability", Issued in PCT Application No. PCT/US2006/025437, Mailing Date: Jan. 17, 2008.
"International Search Report", Application No. PCT/US2006/25437, Mailing Date: Dec. 6, 2006.
"Written Opinion", Application No. PCT/US2006/25437, Mailing Date: Dec. 6, 2006.
"Non Final Office Action", U.S. Appl. No. 11/370,487, Mailing Date: Mar. 25, 2009.
"Non Final Office Action", U.S. Appl. No. 11/370,487, Mailing Date: Jun. 11, 2009.
"International Search Report", Issued in PCT Application No. PCT/US2008/072484, Mailing Date: Feb. 13, 2009.
"Written Opinion", Issued in PCT Application No. PCT/US2008/072484, Mailing Date: Feb. 13, 2009.
"Internationai Preliminary Report on Patentability", Issued in PCT Application No. PCT/US2008/072484, Mailing Date: Feb. 18, 2010.
"Non Final Office Action", U.S. Appl. No. 11/835,228, Mailing Date: Sep. 9, 2010.
"International Search Report", Issued in PCT Application No. PCT/US2008/072493, Maiiing Date: Feb. 13, 2009.
"Written Opinion", Issued in PCT Application No. PCT/US2008/072493, Mailing Date: Feb. 13, 2009.
"Internationai Preliminary Report on Patentability", Issued in PCT Application No. PCT/US2008/072493, Mailing Date: Feb. 18, 2010.
"Non Final Office Action", U.S. Appl. No. 11/835,233, Mailing Date: Jun. 9, 2009.
"Final Office Action", U.S. Appl. No. 11/835,233, Mailing Date: Oct. 30, 2009.
"Non Final Office Action", U.S. Appl. No. 11/835,233, Mailing Date: Jun. 25, 2010.
"International Search Report", Issued in PCT Application No. PCT/US2008/080598, Maiiing Date: May 26, 2009.
"Written Opinion", Issued in PCT Appiication No. PCT/US2008/080598, Mailing Date: May 26, 2009.
"Notice of Allowance and Fees Due", U.S. Appl. No. 11/925,826, Mailing Date: Jun. 18, 2010.
"European Search Report", Issued in EP Patent Application No. EP 08 17 1759, Mailing Date: Jul. 31, 2009.
"Notice of Allowance and Fee(s) Due", U.S. Appl. No. 11/965,668, Mailing Date: Oct. 8, 2009.
"Non Final Office Action", U.S. Appl. No. 12/705,195, Mailing Date: Dec. 27, 2010.
"Written Opinion", Issued in PCT Application No. PCT/US2010/037985, Mailing Date: Dec. 31, 2010.
"International Search Report", Issued in PCT Application No. PCT/US2010/037985, Mailing Date: Dec. 31, 2010.
"Non Final Office Action", U.S. Appl. No. 12/481,847, Mailing Date: Nov. 4, 2010.
"Final Office Action", U.S. Appl. No. 12/481,847, Mailing Date: Feb. 9, 2011.
"Non Final Office Action", U.S. Appl. No. 10/834,448, Mailing Date; Mar. 4, 2009.
"Final Office Action", U.S. Appl. No. 10/834,448, Mailing Date: Dec. 9, 2009.
"Non Final Office Action", U.S. Appl. No. 10/834,448, Mailing Date: Feb. 7, 2008.
"Non Final Office Action", U.S. Appl. No. 10/834,448, Mailing Date: Feb. 18, 2010.
"Final Office Action", U.S. Appl. No. 10/834,448, Mailing Date: Aug. 3, 2010.
"Final Office Action", U.S. Appl. No. 11/174,033, Mailing Date: Jan. 11, 2012.
"Non Final Office Action", U.S. Appl. No. 12/839,373, Mailing Date: Jun. 7, 2012.
"Examination Report", EP Patent Application No. EP 08 17 1759, Mailing Date: Jun. 8, 2012.
"International Search Report", PCT Application No. PCT/US2011/026158, Mailing Date: Nov. 30, 2011.
"Written Opinion" PCT Application No. PCT/US2011/026158, Mailing Date: Nov. 30, 2011.
"Non Final Office Action" U.S. Appl. No. 12/174,404, Mailing Date: Apr. 2, 2012.
"Final Office Action", U.S. Appl. No. 11/174,033, Mailing Date: Mar. 27, 2012.
"Non Final Office Action", U.S. Appl. No. 12/839,373, Mailing Date: Dec. 22, 2011.
"Final Office Action", U.S. Appl. No. 12/839,373, Mailing Date: Nov. 15, 2012.

* cited by examiner

ARRANGEMENT FOR UTILIZATION RATE DISPLAY AND METHODS THEREOF

PRIORITY CLAIM

This application is a continuation application and claims priority under 35 U.S.C. §120 to a commonly assigned application entitled "Methods and Arrangement for Utilization Rate Display," by Matityahu et al., application Ser. No. 11/835,233, filed on Aug. 7, 2007 now U.S. Pat. No. 7,903,576, which is all incorporated by reference herein.

CROSS-RELATED APPLICATIONS

The present invention is related to the following applications, all of which are incorporated herein by reference:

Commonly assigned application entitled "Intelligent Communications Network Tap Port Aggregator," filed on Mar. 7, 2006 herewith by Matityahu et al. and application Ser. No. 11/370,487.

BACKGROUND OF THE INVENTION

Telecommunication networks have long been employed to facilitate communication between users who are geographically dispersed. Communication may include transmission of data packets, such as data and voice packets, between a plurality of network devices, such as routers and switches. In today's business environment, a company's network may perform an important role in enabling a company to conduct its business. A company's network may have a plurality of routers and/or switches connected together. In a large company, the number of routers and/or switches may easily grow to a few hundreds. To manage the company's network in order to assure that the network is fully functionally, the information technology (IT) personnel may make sure that each router and/or switch is performing properly.

One conventional method for monitoring the network may include logging onto the network system in order to extract statistical data about the performance of each router and/or switch. A less manual method may include employing monitoring tools to extract the statistical data and to employ an analytical application program to analyze the statistical data. Even so, the statistical data is not readily available and the IT (information technology) personnel may still be required to log onto the network system and/or router/switch in order to access this information.

In addition, the statistical data that IT personnel, such as a technician, may need in order to perform his task of maintaining and monitoring the health of the network system may not always be accessible to the IT personnel. In a typical network environment, certain servers may include highly sensitive information. As a result, not everyone in the IT department may have access to every aspect of the network. As a result, to access the statistical data, authorization may be required.

BRIEF SUMMARY OF THE INVENTION

The invention relates, in an embodiment, to an arrangement in a network device for displaying statistical data pertaining to data traffic that traverses the network device. The arrangement includes a power supply arrangement for providing power to circuitry of the network device. The arrangement also includes a set of network ports, which includes a set of input network ports for receiving the data traffic and a set of output network ports for outputting the data traffic from the network device. The arrangement further includes logic arrangement for analyzing the data traffic and for displaying the statistical data pertaining to the data traffic. The arrangement yet also includes a visual display arrangement, which is configured to display the statistical data, whereas the data traffic is configured to traverse the network device between the set of input network ports and the set of output network ports irrespective whether the power is provided to the circuitry of the network device.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, a network may include a plurality of network devices. Each network device may store statistical data about the data traffic (e.g., data, media, voice, etc.) that may flow through the device. To monitor the activities on the network, a monitoring system may be employed.

Figure 1:
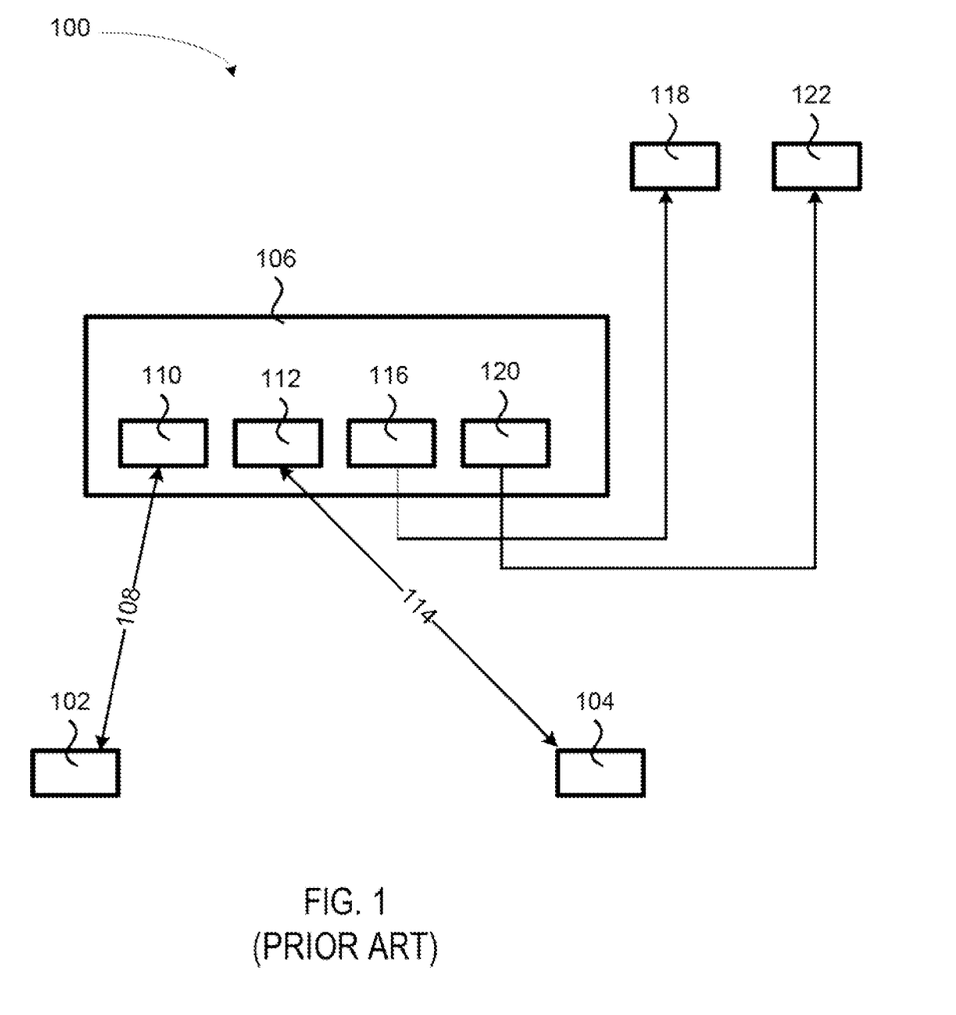
FIG. 1 shows a simple network diagram with a network tap.

To facilitate discussion, prior art FIG. 1 shows a simple network diagram with a network tap. As discussed herein, a network tap is an example of a network device that may be employed to monitor the activities on a network link. A network arrangement 100 may include a set of network devices, such as an Ethernet switch 102 and an Ethernet router 104, to facilitate the transmission of the stream of data packets. Network arrangement 100 may also include a network tap 106, which may sit in-line on a network link (as shown by paths 108 and 114) between the two network devices (Ethernet switch 102 and Ethernet router 104). In an example, stream of data packets may flow from Ethernet switch 102 upstream along path 108 to a port 110 over to a port 112 and out to Ethernet router 104 via path 114. Similarly, data from Ethernet router 104 may flow upstream along path 114 to port 112 through port 110 down path 108 to Ethernet switch 102.

Network tap 106 may act as a bridge between Ethernet switch 102 and Ethernet router 104. By employing network tap 106, monitoring of the data traffic between Ethernet switch 102 and Ethernet router 104 may be monitored Network tap 106 may be a dual ports monitoring arrangement. In an example, the stream of data packets received by port 110 may be copied and forwarded through a port 116 to a monitoring device 118. Similarly, the stream of data packets received by port 112 may be copied and forwarded through a port 120 to a monitoring device 122. Examples of monitoring device may be a PC, an intrusion detection system, a network analyzer, an intrusion prevention system, and the like.

Figure 2:
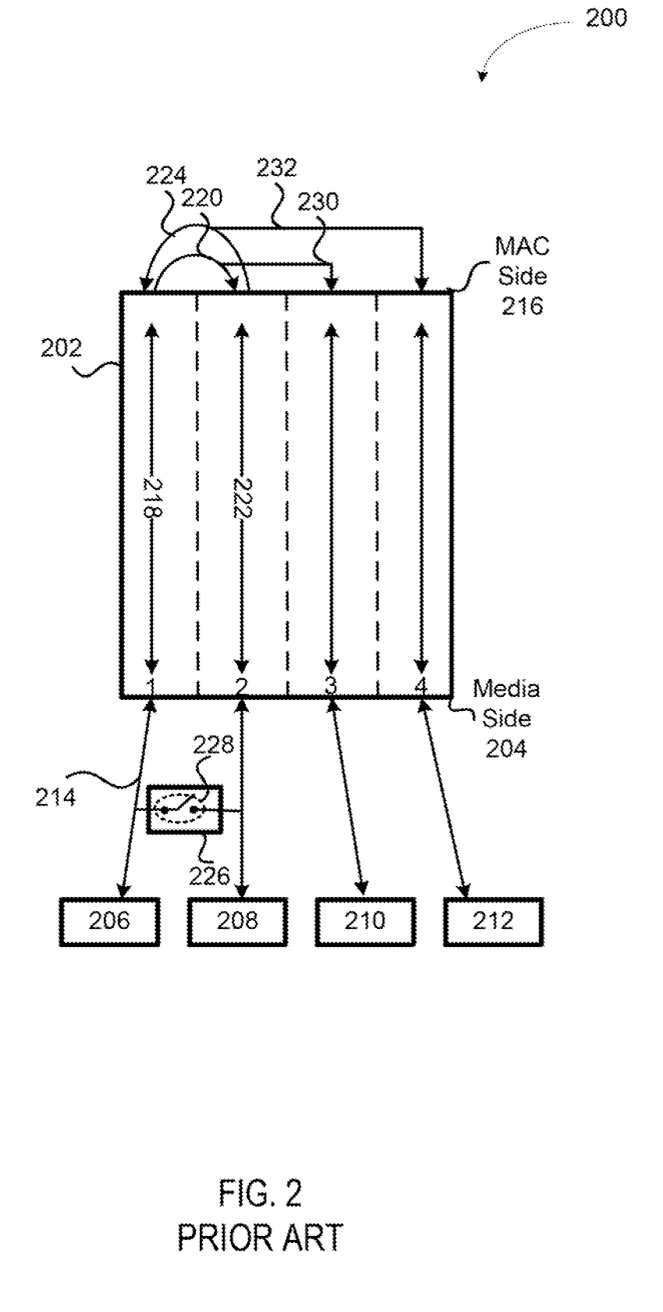
FIG. 2 shows a schematic of a network tap.

To understand how a network tap may function, prior art FIG. 2 shows a schematic of a network tap. Network tap 200 may include a PHY (physical interface layer) chip 202, which may be an Ethernet transceiver. As discussed herein, a PHY chip refers to a chip that may be employed to receive and transmit signals, which may include data packets. A media side 204 of PHY chip 202 may enable PHY chip 202 to connect with the physical ports (206, 208, 210, and 212) of network tap 200. In an example, stream of data packets may be received at a port 206 and transmitted along a line 214 to PHY chip 202. The stream of data packets is usually received as an analog signal.

The stream of data packets from port 206 may travel through PHY chip 202 along path 218 out on a media access controller (MAC) side 216 of PHY chip 202. PHY chip 202 may be employed to convert the analog signal to a digital signal before sending the signal out on MAC side 216. The stream of data packets may loop back via a bus line 220 through PI-PI chip 202 to travel to port 208 via a path 222. Similarly, a bus line 224 may be employed to loop stream of data packets traveling from port 208 to port 206. In an example, the bus line that may be employed to loop data between the ports may be a reduced gigabit media independent interface (RGMII).

Network tap 200 may also include a passive circuit 226. Passive circuit 226 may include a switch 228 that may close to create a bypass route between port 206 and port 208 when power is not available.

For monitoring purposes, the stream of data packets received may be copied and sent to monitoring devices on port 210 and port 212. In an example, stream of data packets received by port 206 may be sent through PHY chip 202. PHY chip 202 may convert the stream of data packet from analog to digital before sending the stream of data packets out on MAC side 216. A copy of the digital stream of data packets may be sent along a line 230 back through PHY chip 202 to monitor port 210. Note that as the digital stream of data packets travels through PHY chip 202, PHY chip 202 may convert the stream of data packets back to an analog signal. Similarly, stream of data packets received by port 208 may be sent to a port 212 via a line 232.

As can be appreciated from the foregoing, monitoring systems, such as the one described in FIGS. 1 and 2 may collect a plurality of statistical data about a company's network. However, the statistical data is not readily available. In an example, to retrieve the statistical data, IT personnel may have to log onto the system in order to access the data.

In one aspect of the invention, the inventors herein realizes that the time IT personnel may spend on retrieving the statistical data in order for the IT staff to perform maintenance and monitoring may be substantially minimized if the network data is readily available. It is desirable therefore to provide a convenient method for accessing network data, especially the utilization rate of a port. The inventors herein realized that if the data is visually displayed, the IT personnel may quickly access the health of each component of the network without being required to log onto the system to retrieve the information. Further, by visually displaying the information, IT personnel may be able to support network devices that may be associated with highly sensitive information without being required to acquire authorization to access the server that may hold the highly sensitive information.

In accordance with embodiments of the invention, a network device with a visual performance display arrangement is provided. Embodiments of the invention also include methods for calculating and displaying a utilization rate for a network port. As discussed herein, a utilization rate refers to the actual throughput of a network port.

In this document, various implementations may be discussed using utilization rate as an example. This invention, however, is not limited to utilization rate and may include any network parameters. Instead, the discussions are meant as examples and the invention is not limited by the examples presented.

Also, in this document, various implementations may discuss using a dual port network tap as an example. This invention, however, is not limited to a dual port network tap and may include other network devices, such as a port aggregation tap, a bypass switch, a regeneration tap, a matrix switch, and the like. Instead, the discussions are meant as examples and the invention is not limited by the examples presented.

In an embodiment of the invention, a network device with a visual performance display arrangement may be provided for displaying vital network parameters. Examples of network parameters may include, but are not limited to, real-time utilization rate of network capacity, average utilization rate, highest peak of traffic peaks, traffic types, fault conditions, and the like. In an embodiment, network parameters for each port may be displayed. The network parameters may be displayed in text and/or graphically. As can be appreciated from the foregoing, the network parameters may be visually available without requiring IT personnel to log in to retrieve the data, thereby increasing the efficiency of the IT personnel and decreasing response time for handling network anomalies.

As can be appreciated from the foregoing, a plurality of network parameters may be available. In an embodiment of the invention, a logic arrangement (e.g., such as an FPGA (field-programmable gate array), an application-specific integrated circuit (ASIC), complex programmable logic device (CPLD), and the like) may be employed to analyze the network parameters and to generate the statistical data. As can be appreciated from the foregoing, the logic arrangement that may be employed to perform the analysis and to calculate the statistical data may vary depending upon the manufacturing preference. In an example, the logic arrangement may include a single programmable component (such as a FPGA). In another example, the logic arrangement may be a set of programmable components (such as a set of FPGAs), with each programmable component being configured to perform different function. In yet another example, the logic arrangement may include a set of, programmable components (such as a set of FPGAs) and a set of programmable digital electronic component (such as a set of microprocessors).

A network parameter that is commonly employed to quickly determine the status of a port is a utilization rate. To determine the utilization rate, the logic arrangement may be configured to include a set of counters for each port. In an embodiment, a first counter may be employed to keep track of each instance of a valid data packet received by a port. The data for valid data packet may be extracted from an RX_DV signal of an RGMII bus that is connected to the MAC side of a PHY. RX_DV is a control signal that may indicate a valid data packet being received by a port. In an example, when a valid data packet is received, the RX_DV signal may be asserted (i.e. go high) and the RX_DV signal may go low when the transmission has been completed. Thus, the logic arrangement may be able to identify the valid data time period by analyzing the RX_DV signal.

In an embodiment, a second counter may be employed to keep track of the number of bytes being received. The byte data may be extracted from an RX_CLK signal of an RGMII bus. In an embodiment, for a gigabits Ethernet device, the RX_CLK signal is a 125 megahertz clock that employs a double rate transmission. In other words, for each clock cycle (up and down), two bytes are being received.

To identify the number of bytes that may be received during a valid data time period, the logic arrangement may correlate the RX_DV signal with the RX_CLK signal. With the number of bytes, the logic arrangement may then convert the data from bytes to bits information. In other word, if 7 bytes are received for a valid data packet, the logic arrangement may convert the bytes into bits by multiplying the number of bytes received by 8, thereby getting 56 bits.

In addition, the logic arrangement may normalize the data. In an example, a monitor cycle may be every one second but the data collected by the counter may be collected at every 1/10 of a second. In the above example, the 56 bits may be normalized to be 560 bits per second. The normalized data may indicate the amount of data that is actually being received by a port. To determine the utilization rate, the logic arrangement may divide the actual rate of data received by the line rate a network device is capable of carrying. In this example, for a one-gigabits Ethernet device, which is capable of transmitting up to 1 gigabits of data, to only be receiving data at 560 bits per second may be a cause for concern. By displaying the utilization rate for easy viewing, the IT personnel may be able to promptly address the problem.

The features and advantages of the present invention may be better understood with reference to the figures and discussions that follow.

Figure 3A:
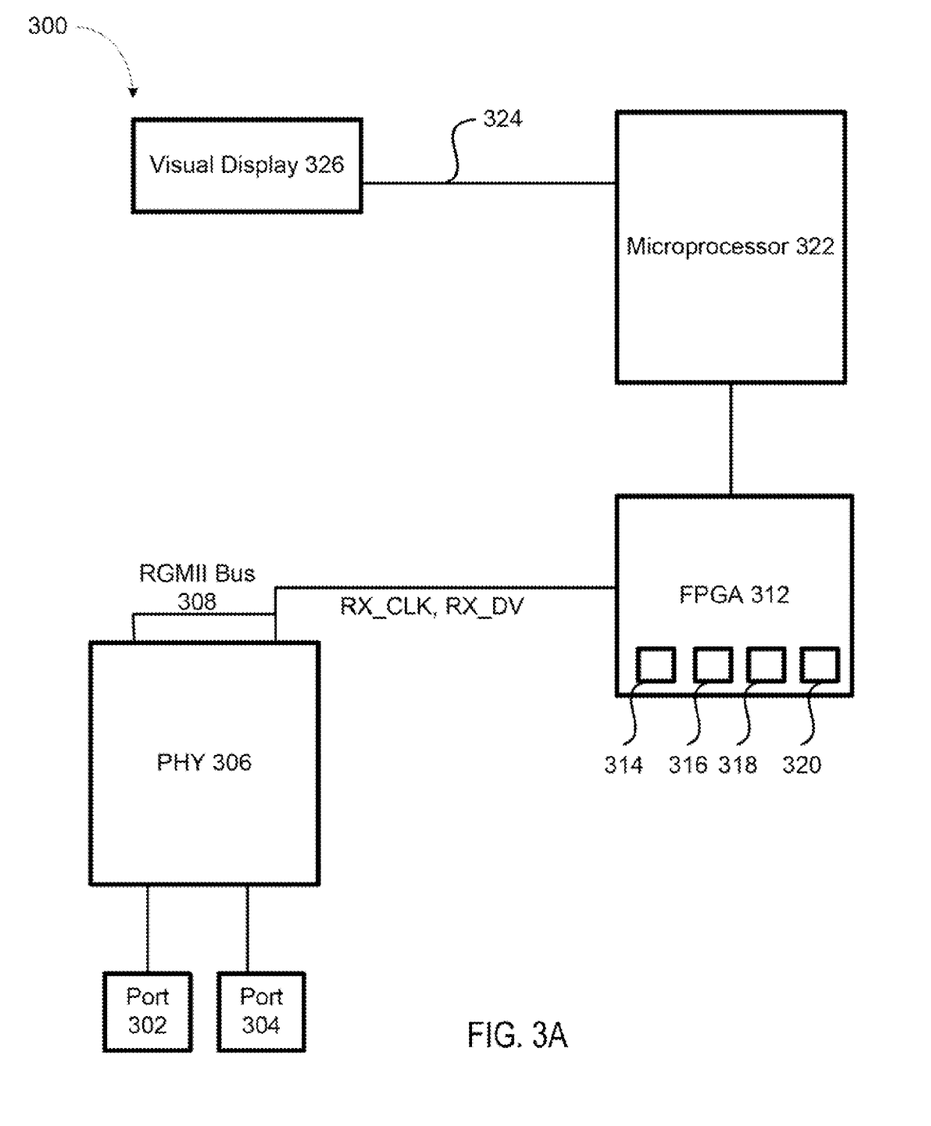
FIG. 3A, shows in an embodiment of the invention, a simple block diagram of a network tap with a visual performance display arrangement.

FIG. 3A shows, in an embodiment of the invention, a simple block diagram of a network tap with a visual performance display arrangement.

A network tap 300 may include port 302 and port 304. As aforementioned, network tap may be employed to monitor the data traffic of a network. As can be appreciated, network tap is able to perform its monitoring function without interfering with the normal data traffic. In other words, data traffic may flow between ports 302 and 304 without interruption irrespective whether power is available to power-up the circuitry of network tap 300. In an example, data traffic may flow into port 302 to an Ethernet transceiver; such as PHY 306, and out through port 304. Thus, data traffic may continue to flow between the ports whether or not network tap 300 is performing its monitoring function.

Figure 3B:
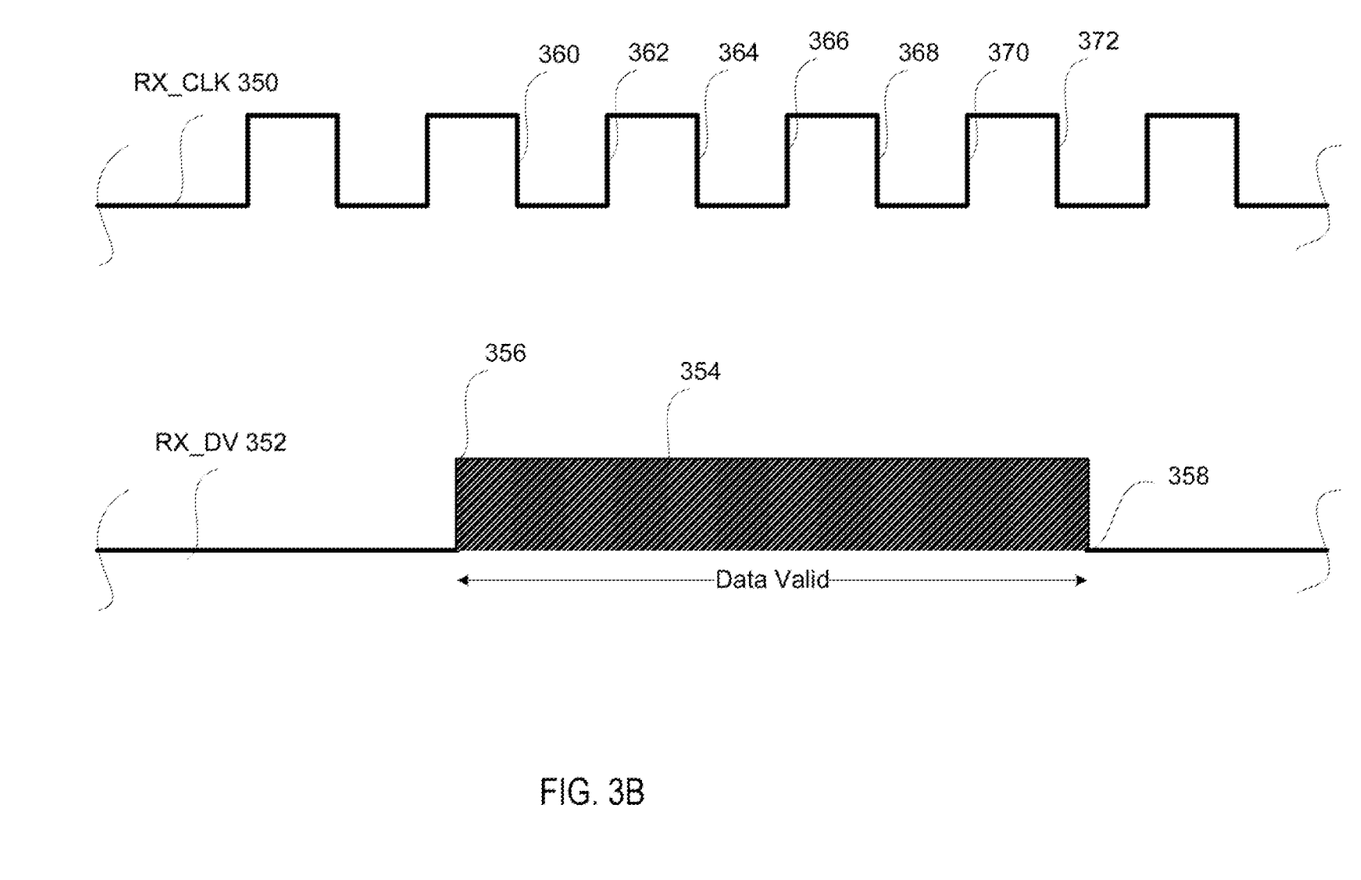
FIG. 3B, shows in an embodiment of the invention, a simple diagram of a RX_CLK and a RX_DV signals.

However, if power is available to enable network tap 300 to perform its monitoring function, the same data traffic which may flow into port 302 and is received by PHY 306 may be copied. In an embodiment, a bus, such as an RGMII bus 308, may be configured to direct the copy of the data traffic to the monitor devices. Those skilled in the art are aware that RGMII bus 308 may include a plurality of signals, including, but are not limited to, RX_CLK, RX_DV, GTX_CLK, TX_EN, RXD[3:0], and TXD[3:0]. In an embodiment, two signals, such as an RX_CLK signal 350 and an RX_DV signal 352 (as shown in FIG. 3B), may be'extracted from RGMII bus 308 and be sent along a path to a logic arrangement, such as a field-programmable gate array (FPGA) 312. FPGA 312 may include intelligence for determining when data is valid on RGMII bus 308 based on the two signals (RX_CLK and RX_DV).

FPGA 312 may include 2 counters for each port (counter 314, counter 316, counter 318, and counter 320). In an embodiment, counter 314 may be associated with RX_DV signal 352 and may be incremented for each occurrence of valid data. In an example, when a data packet is received by port 302, counter 314 may increase by one.

In another embodiment, counter 316 may be associated with RX_CLK signal 350 and may be incremented for each byte received. FPGA 312 may employ RX_CLK signal 350 as the clock for measuring the number of bytes that may be received during a valid data time period. RX_CLK signal 350 is a 125 megahertz clock for a 1 gigabytes Ethernet. Since the RX_CLK signal 350 may be a control signal from RGMII bus 308, two bytes are assumed to be received in each clock cycle. In other words for each lowering or rising edge (360, 362, 364, 366, 368, 370, and 372), a byte is received.

In order to determine the number of bytes received during a valid data time period, FPGA 312 may combine the two control signals.

In an example, when a data packet is received by a port, RX_DV signal 352 may be asserted (i.e., go high). In other words, when RX_DV signal 352 is high (as shown by shaded section 354) a valid data packet has been received. In an embodiment, the time period between rising edge 356 and lowering edge 358 may indicate the valid data time period.

Although RX_DV signal 352 may be employed to indicate when data is valid, RX_DV signal 352 does not provide information about the byte size of the incoming data packet. Since the number of bytes per packet is unknown, RX_CLK signal 350 may be employed to determine the number of bytes in a valid data packet. Those skilled in the arts are aware that for a RGMII bus, data is sent out for each falling clock and each lowering clock of the 125 megahertz clock. Thus, by counting the number of rising and lower edges (360, 362, 364, 366, 368, 370, and 372) of RX_CLK signal 350 when RX_DV signal 352 is asserted, the number of bytes for each valid data time period may be determined.

Once the counters in FPGA 312 have collected the data and have correlated the two signals to determine the valid number of bytes for each valid data time period, the utilization rate may be determine. In an embodiment, the logic arrangement may include one or more programmable component. In an example, the same FPGA 312 may perform the analysis. In another example, FPGA 312 may forward the data collected to another programmable component in the logic arrangement, such as a microprocessor 322, to determine the utilization rate. As can be appreciated from the foregoing, the calculation of the utilization rate may depend upon the network device that may have been employed. In an example, for a 1 gigabits Ethernet, the number of bytes collected during a valid data time period may have to be divided by a gigabits to determine the actual utilization rate.

Once the utilization rate has been determined, the utilization rate may be forwarded along a path 324 to be display on a visual display 326 of network tap 300, in an embodiment. As can be appreciated from the foregoing, besides being displayed, the utilization rate may also be distributed by other methods, such as sending the statistical data as a report to a remote user or forwarding the data to an application program for analysis. Also, as can be appreciated from the foregoing, since the data may be remotely accessible, monitoring may be performed offsite, enabling the IT personnel more flexibility in performing their task of keeping the network fully functional.

As can be seen from FIGS. 3A and 3B, by extracting the relevant control signals from the bus line, the logic arrangement, such as the FPGA and the microprocessor, may be able to calculate the utilization rate of a network port. By displaying the utilization rate, IT personnel may be able to easily view the data without having to log onto the network system to retrieve the data. Besides displaying real-time data, the visual performance display arrangement may also display historical trend, such as the greatest traffic peak, to aid the IT personnel with maintaining and monitoring the network. As can be appreciated from the foregoing, by making the data visually available, the need for authorization code to access network devices associated with highly sensitive information may be substantially eliminated. Thus, low-level IT personnel may perform their job without the company having to be concerned about unauthorized users gaining access to confidential information.

Figure 4:
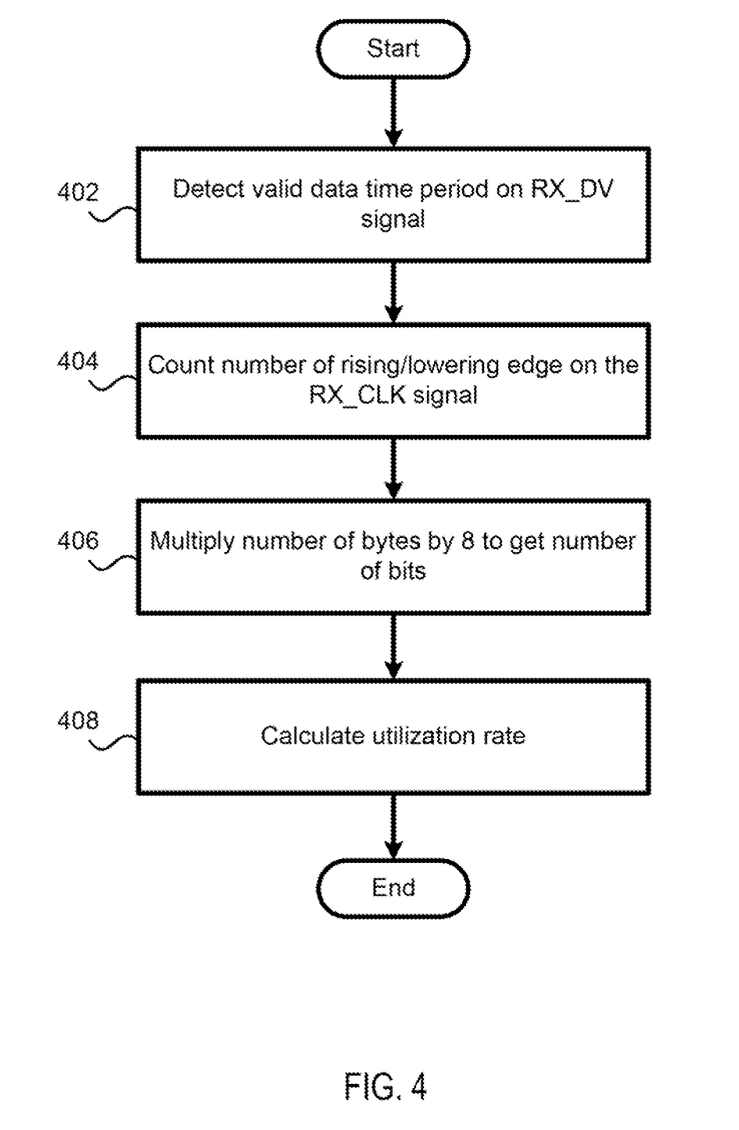
FIG. 4 shows, in an embodiment of the invention, a simple flow chart illustrating a methodology for calculating the utilization rate.

FIG. 4 shows, in an embodiment of the invention, a simple flow chart illustrating a methodology for calculating the utilization rate. FIG. 4 will be discussed in relation to FIGS. 3A and 3B to provide an illustration of how the steps may be implemented. Consider the situation wherein, for example, a valid data packet has been received by port 302.

At a first step 402, a logic arrangement may detect valid data time period on a RX_DV signal. In an example, FPGA 312 may analyze RX_DV signal 352 to determine rising edge 356 that may indicate the beginning of valid data time period 354. As aforementioned, only one data packet is received during each valid data time period. Thus, counter 314 may increase by one to indicate the new valid data time period.

At a next step 404, the logic arrangement may count the number of rising and lowering edges on a RX_CLK signal. To determine which section of RX_CLK signal to count, FPGA 312 may correlate RX_CLK signal 350 against RX_DV signal 352 to determine the number of rising and lowering edges. In an example, during valid data time period 354, seven bytes may have been collected based on the rising and lowering edges (360, 362, 364, 366, 368, 370, and 372) of RX_CLK signal 350.

At a next step 406, the number of bytes is converted into the number of bits. Once FPGA 312 has determined the number of bytes collected, FPGA 312 may forward the data to microprocessor 322. Since the network device is a gigabits Ethernet device, microprocessor 322 may first convert the number of bytes to the number of bits. Those skilled in the arts are aware that 8 bits are in each byte. Thus, the number of valid bits in valid data time period 354 may be 56 bits (e.g., 7 bytes×8 bits).

At a next step 408, the utilization rate may be calculated. Before calculating the utilization rate, microprocessor 322 may normalize the data. In an example, 56 bits have been transmitted for each $\frac{1}{10}$ of a second. However, a collection cycle may be occurring every one second. Thus, in every one second 560 bits per second may be transmitted.

Once the data has been normalized, the logic arrangement may calculate the utilization rate. Utilization rate may be calculated by dividing the actual number of bits per second into the number of bits per second a line may be capable of carrying. In this example, since the network device is a one gigabits Ethernet device, the microprocessor may divide the normalized number into one gigabits to determine the utilization rate.

As can be appreciated from the foregoing, the same procedure described in FIG. 4 may also be applied to other bus lines, such as a GMII, that may also have control signals, such as RX_DV and RX_CLK, from which utilization rate may be calculated.

Figure 5:
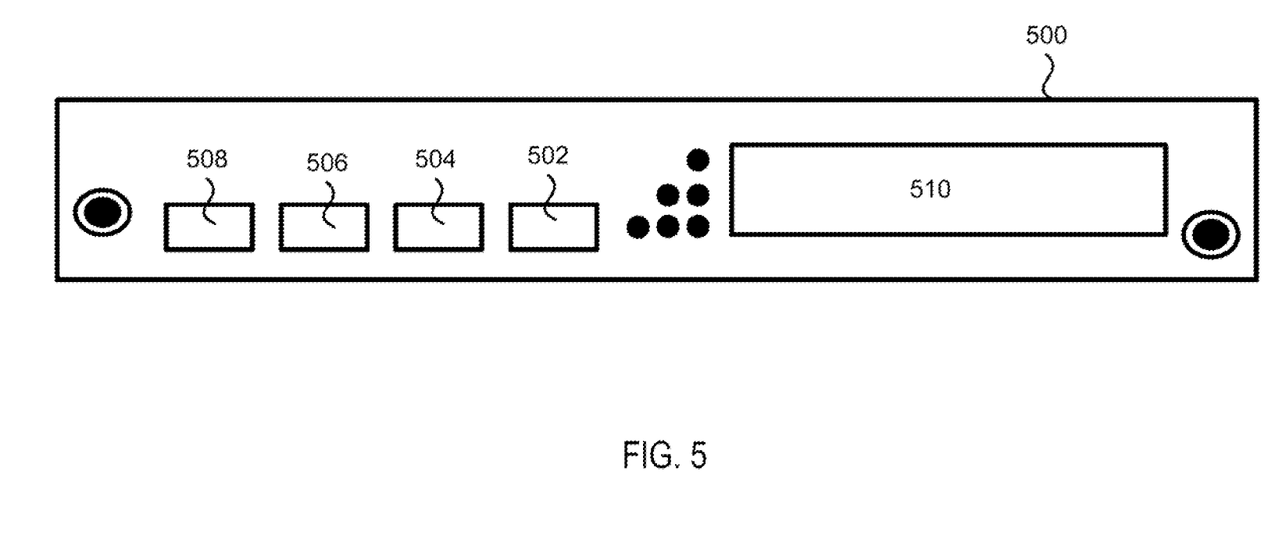
FIG. 5 shows, in an embodiment of the invention, an example of a network device with a visual performance display arrangement.

FIG. 5 shows, in an embodiment of the invention, an example of a network device with a visual performance display arrangement. A network device 500 may include a plurality of ports. In this example, network device 500 may include two network ports (502 and 504) and two monitoring ports (506 and 508). As can be appreciated from the foregoing, the network device may be any device that is capable of directing Ethernet traffic. Thus, network device 500 may be a router, a switch, a network tap, and the like.

A visual display arrangement 510 may also be coupled to network device 500. In an example, visual display arrangement may be an LCD (liquid crystal display) screen. As can be appreciated from the foregoing, the size of the visual display arrangement may be dependent upon a manufacturer's configuration preference. In an example, the size of the LCD screen may depend upon the size of the network device.

As can be appreciated from the foregoing, the network parameters that may be displayed on visual display arrangement may be data that may aid IT personnel in performing their task of maintaining and monitoring a company's network. Although utilization rates have been utilized as examples for implementing a network device with a visual performance display arrangement, other network data parameters may also be shown. Examples of type of technical and diagnostic data that is displayed may include, but are not limited to, real-time utilization level for each path of a network link, size and time of the greatest traffic peaks, SNMP traps for system/link/power, average percent utilization of network capacity, counters for total packets, total bytes, and the like.

In an embodiment, network data may be updated periodically to visually display the real-time data. In another embodiment, the data parameters that may be displayed may be cycled. In other words, the amount of data parameters that may be viewed may be limited to the visual display arrangement. To enable the different data parameters to be viewed, different methods may be employed to determine when the network data may be cycled. In an example, data parameters may be displayed for a pre-set time period. In another example, a control component, such as a button or a rolling wheel, may be utilized to enable the IT personnel to select the desired data parameters.

As can be appreciated from the foregoing, the mode in which the data parameters may be displayed may vary. In an example, the network data may be shown as text. In another example, the network data may be shown graphically (e.g., charts, bar graphs, etc.).

As can be appreciated from the foregoing, one or more embodiments of the present invention provide for methods and apparatuses for displaying network parameters on a network device. By visually displaying the network parameters, instantaneous network data parameters may be readily available to the IT personnel at the network device. Thus, efficiency may increase and cost may decrease by making the network data parameters visually accessible.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A network arrangement for automatically displaying statistical data on a network device, comprising:
    a set of input ports for receiving data traffic, wherein said set of input ports including at least a first port;
    a physical interface layer (PHY) configured for copying said data traffic;
    a bus configured for directing a copy of said data traffic to a set of monitoring devices;
    a first logic arrangement for analyzing said copy of said data traffic, wherein said data traffic including a plurality of signals, wherein said plurality of signals including at least
        a Receive Data Valid signal, wherein said Receive Data Valid signal including a Receive Data Valid rising edge and a Receive Data Valid falling edge, and
        a Receive Clock signal, wherein said Receive Clock signal including a Receive Clock rising edge and a Receive Clock falling edge, said Receive Clock rising edge being a first byte of data and said Receive Clock falling edge being a second byte of data;
    a first counter configured to be incremented by one when said Receive Data Valid rising edge is received, said Receive Data Valid rising edge indicating a valid data packet;
    a second counter configured to be incremented by one when at least one of said Receive Clock rising edge and said Receive Clock falling edge is received;
    a second logic arrangement for displaying said statistical data pertaining to said data traffic; and
    a visual display arrangement being configured to display said statistical data.

2. The network arrangement of claim 1 wherein said bus is a reduced gigabit media independent interface (RGMII).

3. The network arrangement of claim 2 wherein said first logic arrangement includes a field-programmable field array (FPGA).

4. The network arrangement of claim 3 wherein said FPGA is configured to perform analysis of said Receive Data Valid signal and said Receive Clock signal to determine a utilization rate of said network device, said utilization rate being said network device throughput.

5. The network arrangement of claim 4 wherein said Receive Clock is a 125 megahertz clock with a double rate transmission.

6. The network arrangement of claim 5 wherein said FPGA is configured to correlate said Receive Data Valid signal to said Receive Clock signal to determine number of bytes in said valid data packet.

7. The network arrangement of claim 6 wherein said number of bytes in said valid data packet is received by a microprocessor, said microprocessor including logic to perform calculations on data gathered by said FPGA to generate said statistical data, said logic including
    converting said number of bytes to a number of bits,
    normalizing said number of bits, and
    calculating said utilization rate by dividing said number of bits by maximum line rate for said network device.

8. The network arrangement of claim 1 wherein said visual display arrangement is an LCD (liquid crystal display) screen.

9. The network arrangement of claim 8 wherein said statistical data displayed on said visual display arrangement is configured to be cycled through.

10. The network arrangement of claim 9 wherein said statistical data is displayed for a pre-set time period.

11. The network arrangement of claim 10 wherein said statistical data is displayed in a text format.

12. The network arrangement of claim 10 wherein said statistical data is displayed in a graphic format.

13. A method for automatically displaying statistical data on a visual display arrangement of a network device, comprising:
    receiving a first data packet at a first port of a set of input network ports, wherein said first port including a first counter and a second counter;
    copying said first data packet;
    utilizing a bus to direct a copy of said first data packet to a set of monitoring devices, wherein said bus is associated with said first port;
    extracting a plurality of signals from said bus, wherein said plurality of signals including at least
        a Receive Data Valid signal, wherein said Receive Data Valid signal including a Receive Data Valid rising edge and a Receive Data Valid falling edge, and
        a Receive Clock signal, wherein said Receive Clock signal including a Receive Clock rising edge and a Receive Clock falling edge, said Receive Clock rising edge being a first byte of data and said Receive Clock falling edge being a second byte of data;
    incrementing said first counter by one when said Receive Data Valid rising edge is received, said Receive Data Valid rising edge indicating a valid data packet;
    incrementing said second counter by one when at least one of said Receive Clock rising edge and said Receive Clock falling edge is received;
    correlating data collected by said first counter and said second counter to calculate said statistical data; and
    displaying said statistical data on said visual display arrangement of said network device.

14. The method of claim 13 wherein said bus is a reduced gigabit media independent interface (RGMII).

15. The method of 14 wherein a field-programmable field array (FPGA) is configured to perform analysis of said Receive Data Valid signal and said Receive Clock signal to determine a utilization rate of said network device, said utilization rate being said network device throughput.

16. The method of claim 15 wherein said FPGA is configured to correlate said Receive Data Valid signal to said Receive Clock signal to determine number of bytes in said valid data packet.

17. The method of claim 16 wherein said number of bytes in said valid data packet is received by a microprocessor, said microprocessor including logic to perform calculations on data gathered by said FPGA to generate said statistical data, said logic including
- converting said number of bytes to a number of bits,
- normalizing said number of bits, and
- calculating said utilization rate by dividing said number of bits by maximum line rate for said network device.

18. The method of claim 13 wherein said visual display arrangement is an LCD (liquid crystal display) screen.

19. The method of claim 13 wherein displaying said statistical data includes periodically updating said statistical data to display real-time data.

20. The method of claim 13 wherein displaying said statistical data includes utilizing a cycling method wherein portion of said statistical data is displayed for a pre-set time period.

21. The method of claim 13 wherein displaying said statistical data includes displaying said statistical data as one of a text format and a graphic format.

* * * * *